United States Patent [19]

Sleator

[11] Patent Number: 4,837,455

[45] Date of Patent: Jun. 6, 1989

[54] INTERRUPT CONTROLLED SWITCHING DEVICE

[76] Inventor: Michael G. Sleator, Star Rte. Box 73, Woodside, Calif. 94062

[21] Appl. No.: 51,635

[22] Filed: May 20, 1987

[51] Int. Cl.[4] .......................................... H01H 47/12
[52] U.S. Cl. ...................................... 307/38; 307/113; 307/115; 307/34; 307/117; 361/173; 361/191; 361/92
[58] Field of Search .................................. 307/34–41, 307/112, 113, 114, 116, 117, 132 R, 141.8, 132 T, 141.4; 337/36, 37, 39, 41, 42, 44, 45, 75, 78, 81, 85, 86, 88, 92, 95, 101–107, 111, 138, 139, 70, 72, 73, 298, 299, 307, 333, 335, 337, 342, 340, 341, 354, 356, 358, 359, 362, 363, 364; 361/160–163, 166, 167, 170, 183, 189, 191, 195, 196, 105, 173, 92, 93; 310/316, 317, 331, 332

[56] References Cited

U.S. PATENT DOCUMENTS

| | | | |
|---|---|---|---|
| 2,843,759 | 7/1958 | Roots | 307/34 |
| 2,861,222 | 11/1958 | Hodtum | 307/34 X |
| 2,931,954 | 4/1960 | Diesel | 361/207 |
| 3,097,353 | 7/1963 | Carter | 361/143 X |
| 3,489,976 | 1/1970 | Marcoux | 337/102 |
| 3,544,941 | 12/1970 | Deissler | 337/38 |
| 3,727,063 | 4/1973 | Turner . | |
| 3,772,568 | 11/1973 | Phillips | 361/92 X |
| 3,795,842 | 3/1974 | Kovacs | 361/92 |
| 3,882,363 | 5/1975 | Misencik | 361/173 |
| 3,944,787 | 3/1976 | Jost | 337/107 X |
| 4,008,403 | 2/1977 | Rose | 307/113 |
| 4,021,679 | 5/1977 | Bolle et al. . | |
| 4,048,812 | 9/1977 | Thomason . | |
| 4,090,093 | 5/1978 | Thompson . | |
| 4,110,632 | 8/1978 | Wyland . | |
| 4,123,796 | 10/1978 | Shih . | |
| 4,288,831 | 9/1981 | Dolikian | 361/92 |
| 4,292,542 | 9/1981 | Bauka | 307/115 X |
| 4,333,119 | 6/1982 | Schoenmeyr | 361/92 X |
| 4,362,949 | 12/1982 | McKenney et al. . | |
| 4,412,267 | 10/1983 | Hansen | 361/92 X |
| 4,414,598 | 11/1983 | Nowell | 361/93 X |
| 4,433,249 | 2/1984 | Long | 361/92 X |
| 4,438,344 | 3/1984 | Albert et al. | 307/146 |
| 4,439,805 | 3/1984 | Tarleton | 361/92 |
| 4,466,040 | 8/1984 | Barthel et al. | 307/130 X |
| 4,508,994 | 4/1985 | Kolm et al. | 315/200 R |
| 4,530,027 | 7/1985 | Berger | 361/92 |
| 4,543,575 | 9/1985 | Liermann | 361/191 X |
| 4,590,581 | 5/1986 | Widdoes, Jr. . | |
| 4,709,320 | 11/1987 | Konopka | 361/92 X |

FOREIGN PATENT DOCUMENTS 909968 11/1962 United Kingdom .................. 337/92

OTHER PUBLICATIONS

Maynard, "You Can Control Almost Any Number of Electrical Devices from Almost Anywhere," *Popular Electronics*, drawing, cover page, 33-37, (Jul. 1967).

Primary Examiner—William M. Shoop, Jr.
Assistant Examiner—Paul Ip
Attorney, Agent, or Firm—Klarquist, Sparkman, Campbell, Leigh & Whinston

[57] ABSTRACT

A power interrupt switching device for independently controlling normal and remote loads from a single control switch. The device includes an edge detector, an energy storage element, and a latch. When power is applied to the switching device, the edge detector detects the power transition and generates an output pulse for a predetermined time. The storage element charges and generates an output after a second predetermined time greater than the first. Consequently, both outputs are not present simultaneously upon the first application of power. If power is interrupted momentarily and then reapplied, the edge detector again generates an output while the storage element maintains its output during the interruption. With both outputs present, the latch is triggered to deliver power through the switching device to a remote load. The latch remains closed until power is removed. Disclosed are three embodiments of the switching device utilizing, respectively, electromagnetic relays, solid state circuitry, and electrothermal relays.

17 Claims, 4 Drawing Sheets

INTERRUPT CONTROLLED SWITCHING DEVICE

TECHNICAL FIELD

This invention relates generally to signal controlled switches. More particularly, the invention relates to a switch device that responds to interruption of the applied power to control the delivery of power to a remote load.

BACKGROUND OF THE INVENTION

It is often desirable to add new loads to an existing electrical circuit while maintaining control of the loads independently of one another. In a home, a common example is the addition of a bathroom exhaust fan when remodeling an older bathroom. One approach would likely be to install a second wall switch alongside the bathroom light switch and add extra wiring within the walls for supplying power to the fan. The work involved, however, is costly and usually forsaken for the cheaper alternative of wiring the fan in parallel with the existing light. Such wiring enforces use of a fan but removes independent control of the light and fan. The same drawback is faced in remodeling existing factories, offices, and stores to add new, remote loads such as additional machinery, equipment, etc.

The present invention offers a low-cost alternative to this dilemma. It offers independent control of additional loads without requiring the installation of additional switches and wiring to the existing electrical circuit.

SUMMARY OF THE INVENTION

An object of the invention, therefore, is to provide a switching device that can be installed within an existing electrical circuit and be controlled by the original switch and yet provide for independent control of an additional load.

Another object of the invention is to provide such a switching device that can be controlled by interrupting the power in a simple-to-learn, predetermined manner.

Yet another object of the invention is to provide such a switching device that can be implemented in a number of embodiments to meet the need of the switching environment.

To achieve these objects, a power interrupt switching device according to the invention provides independent control of normal and additional, remote loads from a single control switch. The switch is already present within the existing electrical circuit. Momentarily opening and closing the control switch controls power through the switching device to the remote load.

A switching device according to the invention includes an input for receiving the applied power and an output for delivering the applied power. Switching means within the device connect or disconnect the input and output to control the delivery of power therethrough. The switching means responds to a momentary interruption of the applied power received at the input of the device.

In a general embodiment, the switching device includes first detecting means for detecting an OFF-to-ON transition of the applied power, such as is caused by closing the control switch. The first detecting means moves in response to the detection from a first state to a second state after a first predetermined time. The switching device further includes a second detecting means for storing energy from the applied power. It also detects the power transition and moves in response from a first state to a second state, but only after a second predetermined time greater than the first. A latch within the switching device responds to the first detecting means being in its first state concurrently with the second detecting means being in its second state to control power to the remote load. These states exist concurrently upon a first application of power followed by an interruption of the power. A subsequent application of power while the states are still concurrent causes the latch means to respond and maintain control over the remote load until power is removed.

Three specific embodiments of the switching device are disclosed. One embodiment utilizes electromagnetic relays, another relies on solid state circuitry, and the third incorporates electrothermal relays. In one aspect of the invention, the electrothermal relays comprise bimetallic metal layers upon which a resistive layer is deposited, eliminating the need for a heating coil. In another aspect of the invention, the metal layers are formed into a bimetallic disk with a predetermined concavity. The disk snaps between an unstressed state when cold and a stressed state when heated in response to temperature. A movable contact is located on the disk and a second contact is located to contact electrically the movable contact when the disk is in the stressed state. The bistability of the relay eliminates arcing that often occurs as a movable contact moves toward and away from a second contact.

The foregoing and other objects, features, and advantages of the invention will become more apparent from the following detailed description of preferred embodiments which proceeds with reference to the accompanying drawings.

DETAILED DESCRIPTION

Overview

Figure 1:
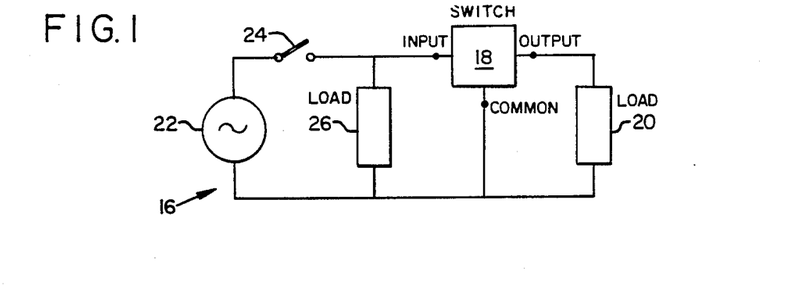
FIG. 1 is a block diagram of an existing electrical circuit with the addition of a switching device according to the invention and an additional remote load.

Referring now to FIG. 1 of the drawings, there is illustrated an electrical circuit 16 to which a switching device 18, according to the invention, has been added along with an additional, remote load 20. The switching device 18 is a three terminal device with input, output, and common or ground terminals. The circuit 16 normally includes a power source 22 in series with a control switch 24 and a normal load 26. The switching device 18 has its input terminal connected to a node that also connects to the load 26 and its common terminal connected to the common of the circuit 16. The physical connection of the device 18 and load 20 to the circuit 16 is usually made by splicing into the existing circuit wires connected to load 26. The load 20 is connected across the output terminal and common terminal of the device 18.

The device 18 has two external states. In its OFF state, an open circuit exists between the input and output terminals and no power is delivered from the power source 22 to the load 20. In its ON state, a closed circuit exists between the input and output terminals and power is delivered to the load 20.

The device 18 controls power to the remote load 20 by the closing, opening, and closing of the switch 24 to apply and interrupt the power in a predetermined manner, as will be discussed in detail hereafter. Assume the function of device 18 in a particular environment is to deliver power upon the momentary interruption of power via switch 24. When the switch is first closed and power first applied to the normal load 26 and the device 18, the device remains in its OFF state. The normal load is activated, but no power is delivered through the device 18 to the remote load 20. The device 18, however, stores energy from the power source 22 while power is being applied. When the switch 24 is open and power removed from the device 18, this energy is dissipated at a predetermined rate. If the switch 24 is now closed once again to reapply power while sufficient energy remains stored in the device 18, the device will change to its ON state. A closed circuit then exists between the input and output terminals, and power is delivered through the device to the remote load 20. The device 18 remains thereafter in its ON state until power is removed by opening the switch 24. If power is again reapplied before the stored energy in device 18 is dissipated, the device 18 remains in the ON state. Only if the switch 24 is open for a sufficient time to allow the stored energy to dissipate substantially does the device 18 reset and revert to its OFF state. Thus to activate only the normal load 26, i.e., a light, the switch 24 is closed and left closed until it is desired to turn off the light. If it is desired to activate the remote load, i.e., a fan, the switch 24 is opened momentarily and then closed once again. Further short interruptions of the power have no effect on the device 18 or the remote load 20.

The function of device 18 may also be reversed so that it is initially in its ON state and is changed to its OFF state by the momentary interruption of power.

Multiple Remote Loads

Figure 2:
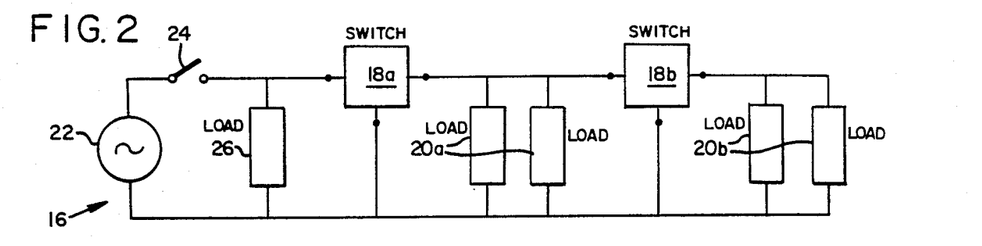
FIG. 2 is a block diagram of an existing electrical circuit with the addition of several switching devices cascaded together with associated remote loads.

Several switching devices 18 can be cascaded to control multiple remote loads with one switch 24. Referring now to FIG. 2, electrical circuit 16 is shown with a switching device 18a controlling a first remote load 20a. and a second switching device 18b controlling a second remote load 20b. The input terminal of the device 18b is connected to the output terminal of the device 18a, and the device 18b is connected to the added remote load 20b as previously described. In FIG. 2, the loads 26, 20a, 20b can be turned on in a fixed sequence and turned off in a reverse sequence or simultaneously. There are many applications where such control is desired. For example, many houses have a front porch light, walkway lights and driveway lights. The front porch light may be the normal load 26 connected directly to the power source 22 through switch 24. The walkway lights are then the first remote load 20a connected to the output terminal of the switching device 18a. The driveway lights are then the second remote load 20b connected to the output terminal of the second switching device 18b.

The operation of the cascade circuit 16 in FIG. 2 is similar to the operation of the circuit 16 in FIG. 1. When the switch 24 is initially closed, only the normal load 26 receives power. If the switch 24 is now open momentarily and closed again, switch 18 changes to its ON state and conducts power to the load 20a. The switch 18b at this point receives power initially and remains in the OFF state while storing energy. If the switch 24 is now momentarily opened and then closed again, the switching device 18b will change to its ON state and conduct power to the additional remote load 20b. If device 18b is designed to dissipate stored energy more quickly than device 18a, the devices can be turned off in reverse sequence. The switch 24 is opened to interrupt power long enough to reset device 18b but not device 18a. Power interruptions that do not reset device 18b have no effect on the state of the switching devices.

The number of switching devices 18 and loads 20 which may be cascaded in this manner is limited primarily by the current demands of the loads and the current carrying capacity of the wiring, switch 24, and devices 18. It should be noted that since power to all loads 20, 26 is interrupted to switch on a switching device 18, a large number of loads may result in substantial in-rush currents in the circuit 16. In such circumstances, suitable current limiting elements known in the art may be added to the circuit 16.

Multistate Switching Devices

The switching device 18 hereindescribed has two external states, OFF and ON, that respond to two corresponding internal states of the device. A limitation, however, on this type of two-state device is its inability to turn on and off selectively the individual remote loads 20a, 20b, etc. One solution is to construct switching devices that can be individually addressed. Although feasible, such a solution would require complex switching devices as well as a complex signaling device and a means of conveying the control signal to the addressed device. An alternative to such complexity is a multistate switching device which has more than two internal states. For each of the internal states, the output of the device is preprogrammed to provide externally either the OFF or ON state. The multistate switching device operates similarly to the two-state device except that successive power interruptions force the multistate device into successive internal states that can change the output state. Upon exhausting the available states, the device either remains in the final state or cycles back to the initial internal state, depending on its design. This approach retains the principal advantages of the original two-state device, namely, simplicity and low cost.

Figure 3:
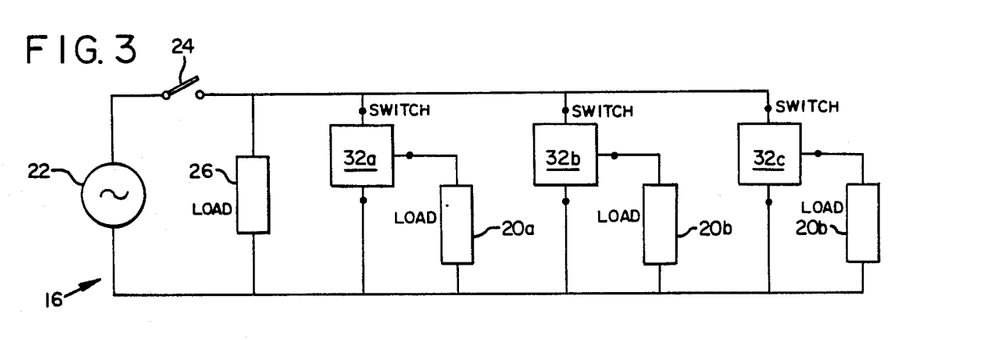
FIG. 3 is a block diagram of an existing electrical circuit with the addition of multistate switching devices and their associated remote loads.

FIG. 3 illustrates an electrical circuit 16 with three multistate switching devices 32a, 32b, 32c, a normal load 26, and three remote loads 20a, 20b, 20c. The devices 32 are connected in parallel in a bus configuration rather than cascaded to enable the switch 24 to address them individually. Table I below details a program of the three multistate devices, each of which is assumed to have four internal states. This programming may be accomplished by means such as DIP switches mounted on the devices 32 themselves, each device having a number of switches corresponding to the number of states the device may enter.

TABLE I

| Device | State | | | |
| --- | --- | --- | --- | --- |
|  | 0 | 1 | 2 | 3 |
| 32a | ON | OFF | ON | OFF |
| 32b | ON | ON | OFF | ON |
| 32c | OFF | ON | ON | OFF |

Assuming the switch 24 has been open for a sufficient time to discharge energy stored in the switching devices 32a, 32b, 32c, all of the devices are reset to their OFF state. When switch 24 is closed, each switching device enters its internal state 0. The external state of each switching device 32 is determined now by its internal state 0. From Table 1, it can be seen that switching devices 32a and 32b are ON and device 32c is OFF. Opening the switch 24 momentarily to interrupt power moves each switching device to its internal state 1. In this state the switching device 32a is now OFF and devices 32b and 32c are ON externally. Subsequent interruptions of power causes the three switching devices to progress through internal states 2 and 3. At this point in the state cycle, further interruptions cause the switching devices to move to internal state 0 again or remain in state 3, depending on the design adopted. The behavior may further be individually selected for each device by means of the external switches (not shown) on each switching device. Similarly, the switching devices 32a, 32b, 32c within a given circuit 16 may each have a different number of internal states for further variation.

A Two-State Switching Device

Figure 4:
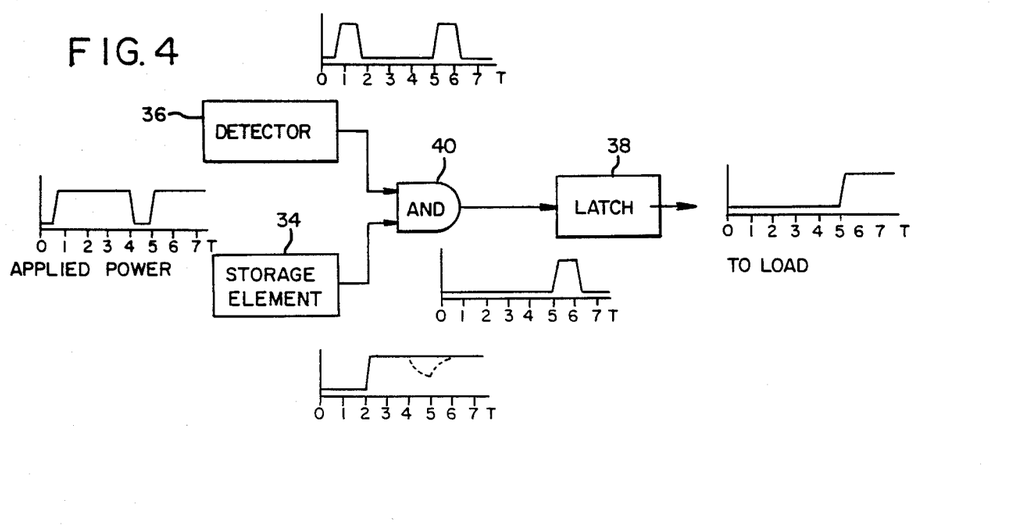
FIG. 4 is a block diagram of a two state switching device according to the invention.

FIG. 4 shows a functional block diagram for implementing the switching device 18 with two internal states. Two internal states are sufficient for the switching device 18 in FIGS. 1 and 2. The blocks comprise basically a second detecting means such as storage element 34, a first detecting means such as detector 36, and a latch 38. The storage element 34 and detector 36 are configured so that their outputs are ANDed together as represented by gate 40, whose output is applied to the trigger latch 38.

The storage element 34 may in principle employ any of a variety of basic phenomenon, depending on the need of the switching environment. The storage mechanisms include electrical charge on a capacitor, mechanical potential energy in a spring, kinetic energy in a moving mass, thermal energy in a mass, or even chemical or optical properties of materials. In the following three described embodiments, the storage mechanism is either electrical charge on a capacitor or thermal energy in a metal. Other storage mechanisms could be used as well with the underlying principle.

The detector 36 is adapted to detect the OFF to ON transition or "edge" of applied power. The detector output is ANDed with that of the storage element 34 via gate 40. When both outputs are present simultaneously, the output of gate 40 triggers the latch 38. The latch 38 has inherent latching behavior, such that once it has been triggered by AND gate 40, it remains on until power is removed from the latch. While the latch 38 is on, power is delivered from the power source 22 to the remote load 20.

The cooperation of the blocks within FIG. 4 is best understood with reference to the adjacent timing diagrams. The time scale T for the timing diagram is arbitrary but approximates a realistic setting if each division is taken to represent one-half second. Assuming that no energy is stored in storage element 34 initially, power is first supplied at T(0.5). It remains applied until T(4), when the power is interrupted until T(5) and then reapplied thereafter. The detector 36 immediately detects the power transition at T(0.5) and signals that detection as an output pulse for a predetermined time, until T(1.5). The storage element 34, on the other hand, produces no output initially for a predetermined time in response to the applied power. The element's output does not appear until T(2), after the output from the detector 36 has terminated. Consequently, the two outputs do not enable AND gate 40 and trigger latch 38 when power is initially applied.

The dotted line in the timing diagram of the storage element 34 illustrates the dissipation of internal energy stored in the element once power is interrupted. Where no power is being applied between T(4) and T(5), the stored energy is dissipated at a predetermined rate. At the rate shown, sufficient energy remains in the storage element 34 to maintain its output when power is reapplied at T(5). On this reapplication, detector 34 again immediately detects the transition and generates another output pulse. With the output from storage element 34 already present at AND gate 40, the output pulse is passed through the gate to trigger latch 38. A pulse rather than a signal spike is desirable because latch 38 in actual embodiments requires a sustained signal in order to latch. The latch 38 in turn then delivers the applied power to the remote load 20, latches and remains latched until power is removed.

A relatively long interruption of power, however, will dissipate sufficient energy in the storage element 34 to terminate its output and prevent triggering of the latch 38 when power is reapplied. The device 18 is then in its OFF or reset state. From the adjacent timing diagram, it can be seen that once power is interrupted the output will terminate by about T(7) unless power is reapplied before then. The duration of the output is a function of the element values chosen in the following embodiments. Repeated interruptions of a shorter duration merely retrigger the latch 38 and do not affect its ability to deliver power to the remote load 20.

The device 18 can also be designed to deliver power to a remote load 20 when power is first applied and remove power from the load when the power is interrupted and reapplied. A simple modification to FIG. 4 for accomplishing this is to invert the output of the latch 38.

Electromagnetic Relay Embodiment

Figure 5:
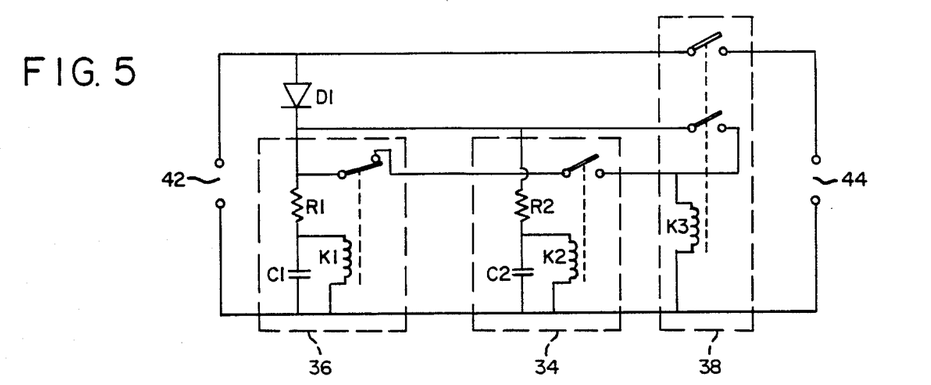
FIG. 5 is a schematic view of an electromagnetic relay embodiment of the switching device of FIG. 4.

FIG. 5 shows a detailed embodiment of the device 18 implemented with electromagnetic relays. As indicated by the dashed lines, detector 36 comprises a resistor R1 in series with a capacitor C1 and a relay K1 in parallel with the capacitor. The contacts of the relay are normally closed. Storage element 34 comprises a resistor R2 in series with a capacitor C2 and a relay K2 in parallel with the capacitor. The contacts of the second relay are normally open. The latch 38 comprises a relay K3 with a dual pair of normally open contacts, the lower contacts for connecting the relay coil to the power source and the upper contacts for connecting the power source to a remote load. A series connection of the contacts of relays K1 and K2 form a conductive path to the coil of relay K3 when both contacts are closed. These contacts provide the AND function represented by gate 40 in FIG. 4. The diode D1 is also included in FIG. 5 for rectifying alternating current power. Power is applied to input terminals 42 and the load is connected to output terminals 44.

When power is first applied, the resistor R1 and capacitor C1 provide a time constant for delaying slightly the opening of the contacts of relay K1, producing an output pulse. Current flows through resistor R1 to charge the capacitor initially. As the voltage in the capacitor approaches the rectified voltage, current through the coil of relay K1 increases until the resultant magnetic field is sufficient to pull in the armature of the relay and open the contacts. The operation of relay K2 is similar, except the time constant is considerably longer so that the contact is pulled closed after the contact of relay K1 is pulled open. Capacitor C2 also must be of a size to store sufficient energy for holding the contact of relay K2 closed during a signaling interruption, such as between T(4) and T(5) in FIG. 4. The contact of relay K1 thus opens before the contact of relay K2 closes, so that the AND function is not executed when power is first applied. No conductive path therefore exists at this point from the input terminals 42 to the coil of relays K3.

When switch 24 is opened to interrupt power, capacitor C1 discharges through the coil of K1, keeping the contact open until the contact bias overcomes the decreasing strength of the coil's magnetic field and closes. Capacitor C2 discharges through the coil of relay K2. Because of the capacitor C2's larger size and the longer time constant relative to capacitor C1, capacitor C2 discharges more slowly and the contact remains closed for a relatively long time after the power interruption. Both pairs of contacts thus are closed for a window of time between the closing of the contacts of relay K1 and the opening of the contacts of relay K2. During this time the conductive path to relay K3 is formed. If power is now reapplied, current will flow through the conductive path to the coil of relay K3. The relay K3 has no significant time constant associated with it and the dual pairs of contacts almost immediately close. The reapplied power is then delivered to the output terminals 44 through the upper contact, with the lower contact providing the latching action through a current path to the coil. The contact of relay K1 eventually opens after capacitor C1 again charges, but the break in that conductive path does not affect operation of the latch 38 because of its latching connection to the reapplied power.

The embodiment of FIG. 5 is intended only to illustrate the invention and not to limit it. Additional features can, of course, be added to improve its operation. For example, diode D1 can be replaced with a full wave rectifier or functionally equivalent circuitry for eliminating relay chatter. To improve accuracy of the time constants, diodes may be placed in series with resistors R1 and R2 to prevent the respective capacitors C1 and C2 from discharging through the resistor. Furthermore, the operation of the embodiment can be inverted by changing the upper contact of relay K3 from normally open to normally closed. The signaling interruption would then remove power from remote load 20.

Solid State Embodiment

Figure 6:
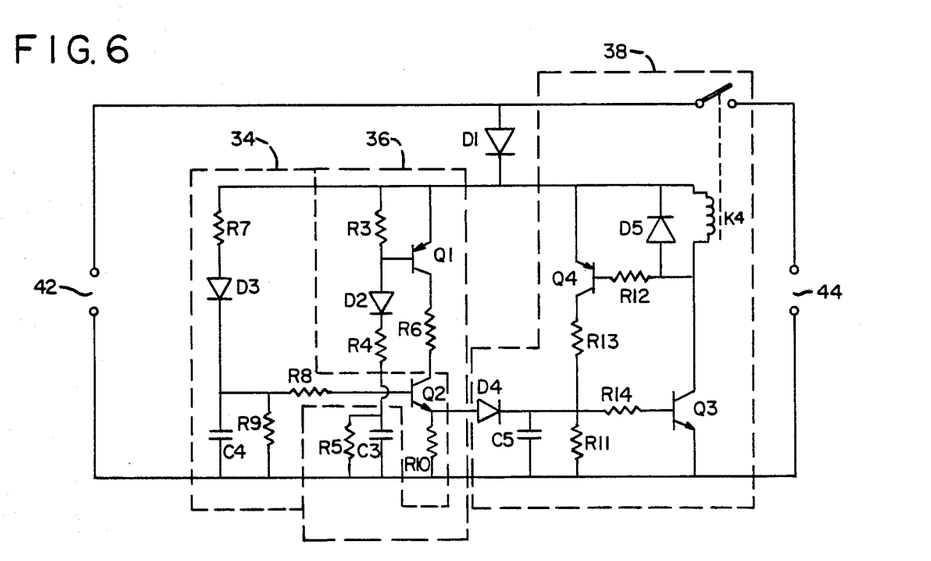
FIG. 6 is a schematic view of a solid state embodiment of the switching device of FIG. 4.

FIG. 6 shows an embodiment of switching device 18 implemented with solid state circuitry. The detector 36 in this embodiment comprises resistors R3 through R6, capacitor C3, diode D2, and transistor Q1. The storage element comprises resistors R7 through R10, capacitor C4, diode D3, and transistor Q2. The latch 38 in turn comprises resistors R11 through R14, capacitor C5, transistors Q3 and Q4, diodes D4 and D5, and relay K4. The diode D1 is again included for rectifying alternating-current based power. The AND function in this embodiment is provided by the presence of collector and base current in transistor Q2 to produce sufficient emitter current that is applied to the base of transistor Q3 to render that transistor conductive.

The detector 36 in FIG. 6 works as follows. Assuming the switching device 18 is reset and therefore capacitor C3 is fully discharged, the initial application of power causes current to flow through the base emitter junction of transistor Q1, and the serial connection of diode D3, resistor R4 and capacitor C3. Current also flows through resistor R3, but little current flows initially through resistor R5 because capacitor C3 is charging. A voltage thus appears at the collector of transistor Q3 and across resistor R6 to produce a collector current. As the capacitor C3 charges after a predetermined time, it becomes an open circuit to the rectified voltage and increased current is drawn through the resistor R5. That resistor, of considerably more resistance than the resistor R3 and R4, is part of a series connection with resistors R2, R3 and R4 that divides the voltage. The values of these three resistors are such that, when capacitor C3 is charged, the voltage across R3 is less than the breakdown voltage of the transistor Q1 base emitter junction. Transistor Q1 therefore detects the initial transition of power and turns off after a predetermined time.

With reference now to the storage element 34, capacitor C4 begins charging through the resistor R7 and diode D3 when power is first applied. After a predetermined time, the voltage on the capacitor C4 exceeds the base emitter breakdown voltage of transistor Q2 and current flows through resistor R8 and transistor Q2. Resistor R10 has a sufficiently low value relative to resistor R8 such that the voltage produced across resistor R10 from the base current does not exceed the base emitter breakdown voltage of transistor Q3. Capacitor C4, however, is of a value that takes longer to charge than capacitor C3. Transistor Q1 thus turns off before transistor Q2 turns on. Without sufficient voltage across its base emitter junction, the transistor Q3 does not conduct. No collector current flows through the connected coil of relay K4 and the relay contacts remain open.

Upon interruption of power, capacitor C3 discharges through resistor R5 because of diode D2 blocking discharge through resistor R4. The transistor Q1 is then set to conduct on the next application of power. Capacitor C4 discharges through resistor R9 and resistor R8, but not resistor R7 because of diode D3. Its discharge time is considerably longer than capacitor C3, and transistor Q2 remains conductive after transistor Q1 is set to conduct.

When power is reapplied, Q1 conducts immediately. With transistor Q2 still conductive, the combined base and collector currents flow into the base of transistor Q3 to render it conductive and into capacitor C5. Transistor Q3, once conductive, draws current into the collector through the coil of relay K4 and causes the armature to pull in the contact and close the circuit between the input terminals 42 and outut terminals 44. In the process of drawing current through the collector, transistor Q3 lowers its collector voltage and renders transistor Q4 conductive. Base current flows through current limiting resistor R12, enabling collector current from transistor Q4 to flow through current limiting resistor R13 to provide additional base current to transistor Q3. This positive feedback of base current provides the required latching action. The capacitor C5 sources current to keep transistor Q3 conductive during the off periods of the half wave rectified power supplied by D1, ensuring the latched state of transistors Q3 and Q4 is not lost. Resistor R11 limits the current from transistors Q1 and Q2 into the base of transistor Q3. Diode D4 prevents capacitor C5 from discharging into resistor R10. The diode also increases the voltage required across resistor R8 to exceed the breakdown voltage on the base emitter junction of transistor Q3. The greater voltage enables a larger resistance to be employed to sink the quiescent current of transistor Q2. The diode D5 clamps the high voltage spikes that would otherwise be produced by the coil of K1 upon sudden change of the current through the coil. Furthermore, the low impedance path provided by diode D5 allows current to continue to flow as the magnetic field of the coil collapses. This current flow slows the field's collapse and reduces the tendency of the relay to chatter.

It should be noted that many variations of the above embodiment are possible. For example, the relay K4 could be replaced with a triac or other semiconductor switch. Representative values for the components of FIG. 6 are listed in Table II below:

TABLE II

| Component | Value |
| --- | --- |
| R3 | 1.2K |
| R4 | 82K |
| R5 | 2.5 M |
| R6 | 4.7K |
| R7 | 12K |
| R8 | 47K |
| R9 | 150K |
| R10 | 270 |
| R11 | 1.8K |
| R12 | 82K |
| R13 | 27K |
| R14 | 560 |
| C3 | .02 microF |
| C4 | 10 microF |
| C5 | 22 microF |

Electrothermal Relay Embodiment

In applications where switching speed is not critical but cost is important, electromagnetic relays can be replaced by electrothermal relays. Electrothermal relays also weigh less and are more durable.

Conventional bimetallic electrothermal relays rely on the differential expansion of two metal strips to produce the motion which opens or closes a pair of contacts. Wire is typically wound around the bimetallic strips to form a resistive heating coil. When current flows through the resistive coil, the coil heats the bimetallic strip which then bends to close the pair of contacts. The drawback of this type of relay is the complexity, reliability, and cost of the coil construction.

Figure 7:
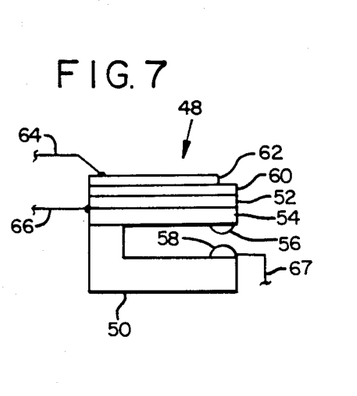
FIG. 7 is a cross-sectional view of an electrothermal relay utilized in the switching device.

An alternative relay that eliminates the need for a heating coil is shown in FIG. 7. A relay 48 comprise a nonconductive frame 50 that supports a bimetallic strip of metal layers 52 and 54. The metal layer 52 has a higher coefficient of expansion than the metal layer 54 so that the bimetallic strip, when heated, bends toward the frame 50 to close a movable contact 56 with a fixed contact 58. Deposited directly upon the metal 52 is a layer 60 of resistive material and upon that a layer 62 of conductive material. The conductive layer 62 uniformly distributes current across the resistive layer 60 to heat the bimetallic strip. The heating current is routed to layer 62 through a lead 64 and passes transversely through the resistive layer and bimetallic layers, with the heating circuit completed through lead 66. The load current when present passes through the bimetallic strip and contacts 56, 58 via leads 66 and 67.

Figure 8A:
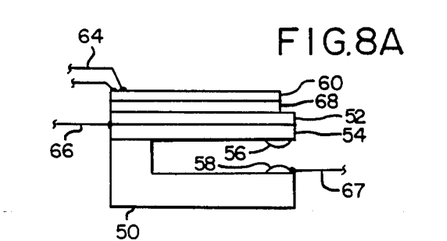
FIG. 8A is a cross-sectional view of another electrothermal relay utilized in the switching device.
Figure 8B:
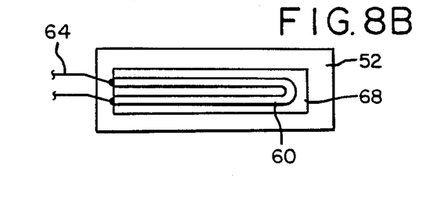
FIG. 8B is a top view, of the relay of FIG. 8A.

In some circumstances, the direct connection between the bimetallic strip and resistive layer 60 is undesirable. For example, the additional heating current and resistance of layer 60 may interfere with the intended voltage and current paths in the circuit utilizing the electothermal relay 48. To avoid the interference, the heating circuity can be isolated from the load circuitry by the insertion of an insulating layer 68 between the metal 52 and the resistive layer 60 as shown in FIG. 8A. The current for heating the resistive layer, however, can no longer flow through the bimetallic strips to lead 66. To complete a heating circuit, the conductive layer 62 is removed and the resistive layer reshaped as a U, as shown in FIG. 8B. A separate lead 64 is connected to each end of the U-shaped layer 60 to complete the circuit.

The physical parameters governing the performance of the heating circuitry in FIG. 7 are the thickness and area of the resistive layer 60, with current flow transverse to the layer and toward the bimetallic strip. In FIGS. 8A and 8B, the parameters are thickness, width and length of the resistive layer, with current flow parallel to the plan of the layer 60.

Figure 9A:
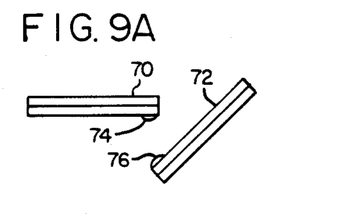
FIGS. 9A through 9C are three views showing how electrothermal relays are utilized in the invention.
Figure 9B:
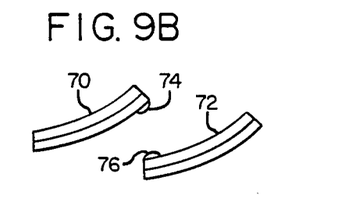
Figure 9C:
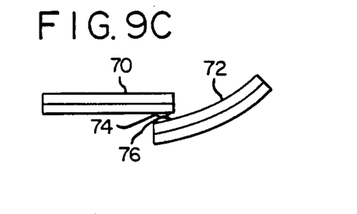

FIGS. 9A through 9C show how the detector 36 and storage element 34 can be constructed from electrothermal relays such as relay 48 by substituting the movable contact of a second relay for the fixed contact 58. FIG. 9A shows the positions of two bimetallic strips 70 and 72 when they are in their cold or unstressed states. Both strips are designed to bend upward when heated, with the contact 74 attached on the bottom of the strip 70 and the contact 76 attached on the top of strip 72 opposite contact 74. Furthermore, the bimetallic strip 70 is designed to heat and cool more quickly than the bimetallic strip 72.

When power is first applied to the attendant relays, strip 70 bends upward more quickly than strip 72 and no electrical contact is made between contacts 74 and 76. FIG. 9B shows the strips 70 and 72 at equilibrium in their stressed states. When power is interrupted, strip 70 cools faster than the strip 72 and contact 74 touches contact 76 to form a conductive path as shown in FIG. 9C. This path exists until strip 72 cools sufficiently to bend further and thereby break the physical contact. If power is reapplied to the attendant relays while the strips 70, 72 are in the position of FIG. 9C, the latch (not shown) is triggered.

Figure 10:
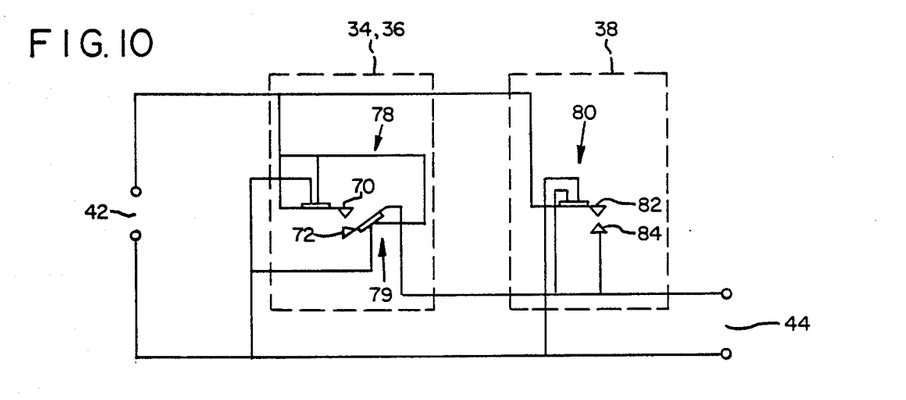
FIG. 10 is schematic view of an electrothermal relay embodiment of the switching device of FIG. 4.

FIG. 10 shows schematically the construction of a switching device 18 with the electrothermal relays of FIG. 8A. The combined detector 36-storage element 34 comprises relays 78 and 79 having movable contacts 70, 72 and associated circuitry isolating the heating currents from the load currents. The latch 38 comprises a relay 80 having a movable contact 82 and a fixed contact 84. As described with reference to FIGS. 9A through 9C, the contacts 70, 72 move apart when power is first applied and then touch temporarily after power is interrupted. With power reapplied while the contacts are touching, current flows through the contacts to the resistive layer of relay 80, causing contacts 82 and 84 to close. The reapplication of power causes contacts 70 and 72 to move apart eventually. But current to the resistive layer of contact 80 is now provided by the relay's own load current, with the resistive layer in parallel with the output terminals. The contacts 82 and 84 open only when power is removed from the input terminals 42 for more than a momentary interruption.

Figure 11A:
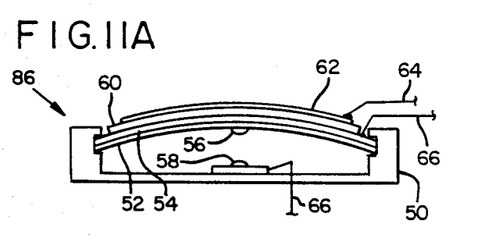
FIG. 11A is a cross-sectional view of a disk-shaped electrothermal relay utilized in the invention, the electrothermal relay shown in its cold, unstressed state.
Figure 11B:
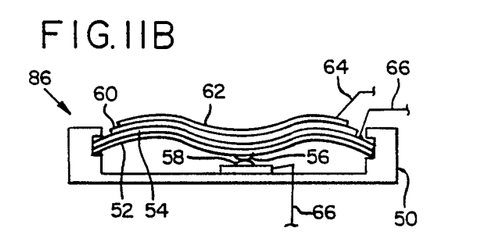
FIG. 11B is a cross-sectional view of the disk-shaped electrothermal relay shown in its heated, stressed state.

Inherent in most electrothermal relays is the phenomenon of prolonged arcing due to the relatively slow movement of the contacts toward and away from each other. In the relay embodiment of switching device 18 such arcing is not significant, but it may be in other embodiments that utilize electrothermal relays. The arcing can be overcome by introducing a mechanical bistability into the electrothermal relay, such that when the bimetallic strip reaches a certain critical temperature it abruptly snaps from one position to its other position. Such a relay 86 can be constructed by forming the bimetallic element into a disk rather than a linear strip as shown in FIG. 11A, with like numerals from FIG. 7 used for like components. The disk is formed into a spherical section having a metal layer 52 at the bottom, metal layer 54 atop metal layer 52, and the resistive layer 60 and conductive layer 62 atop metal layer 54. The cross section of relay 86 is thus the similar to that of relay 48 in FIG. 7, with the heating and load circuitry sharing a common lead 66. The movable contact 56 is mounted at the axis of the spherical section below metal layer 52 and the fixed contact 58 is mounted to the U-shaped frame 50 immediately there below. With the proper spherical radius and orientation of concavity, the multi-layered disk can be made to snap inward when it is heated and reaches a certain temperature, as shown in FIG. 11B. The disk is then stable in either the cold, unstressed state or in the heated, stressed state, but not there between. The relay 86 thus has a sharp snapping action in each direction of travel. The relay 86 may also be constructed with the cross section of FIG. 8, adding the additional insulating layer 68 (not shown) and additional lead 64 (not shown) and removing the conductive layer 62.

Figure 12:
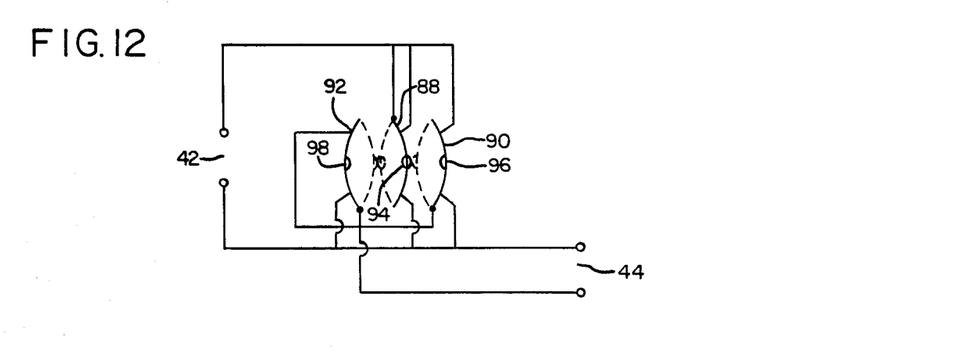
FIG. 12 is a schematic view of another electrothermal relay embodiment utilizing disk-shaped relays.
Figure 13:
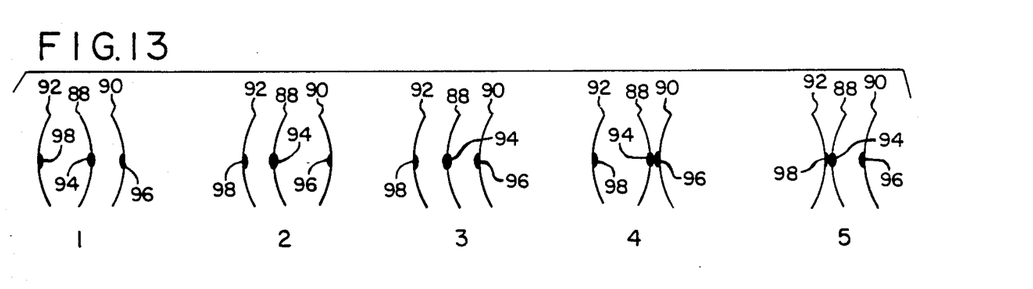
FIG. 13 is a state diagram of the different internal states in the relay embodiment of FIG. 12.

FIG. 12 is a schematic view of a switching device circuit utilizing disk-based electrothermal relays. FIG. 13 shows the five internal states of the multi-layered disks as power is applied, interrupted, and reapplied. Disks 88 and 90 form a combined detector 36-storage element 34, with the contact of disk 88 extending on both sides of the disk. Disk 88 is designed to heat and cool more quickly than disk 90 and thus changes states more quickly. Disk 92 provides the latching action. Disks 88 and 92 are of the form shown in FIG. 11A, with the heating and load circuitry sharing a common lead. Disk 90, on the other hand, includes an insulating layer 62 to isolate the heating circuitry from the load circuitry. The disk 92 is not connected directly to the power source, but relies on the action of disks 88 and 92 to complete the heating circuit.

Referring now to FIG. 13, the switching device 18 is reset in state 1, with all disks in their unstressed states. When power is first applied, disk 88 heats more quickly than disk 90, changing to its stressed state as shown in internal state 2. Thereafter, disk 90 reaches the temperature that causes it to snap into its stressed state as shown in state 3. State 3 is stable so long as power remains applied. When power is interrupted by opening switch 24 (not shown), disk 88 cools more quickly than disk 90, causing disk 88 to snap into its unstressed state as indicated in state 4. The contacts 94 and 96 on disks 88 and 90, respectively, then touch and form a conductive path. If power is reapplied while the device 18 is in state 4, current flows into disk 88 and through the contacts 94, 96 to the heating circuit lead of disk 92. The heating circuitry lead provides current to heat disk 92 as well as current to the output terminal 44. Disk 92 then heats and snaps into its stressed state as disk 88 heats again and also changes to its stressed state. The device 18 thus enters state 5 in FIG. 13 and remains there so long as power is applied. Note that there is a brief interruption of power to the terminals 44 as disk 88 makes its transition from state 4 to state 5, but this interruption is without significant effect. When the contacts 98 of disks 92 close with the contact 94 of disk 88, power is restored to the terminals 44 and to the heating circuitry for disk 92, maintaining the device 18 in state 5. Any further brief interruptions of applied power will cause the device 18 to cycle between states 4 and 5. If, in state 4, the power is interrupted long enough for disk 90 to cool and change state, the device 18 resets to state 1.

Assuming identical transition temperatures, the heating and cooling rates of the disks in the above embodiment depend on three factors: the mass of the disk, the current applied, and the rate at which the heat is removed. For disk 88 to have a faster response than disk 90, the disk 88 can either be less massive, draw more heating current, or be mounted in such a way that it is cooled more quickly.

Figure 14:
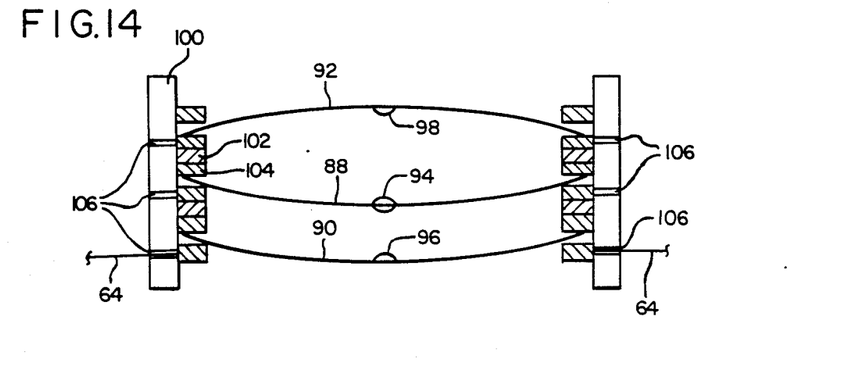
FIG. 14 is a cross sectional view showing the construction of the relay embodiment of FIG. 12.

The circuit of FIG. 12 lends itself to economical and compact construction, as shown schematically in FIG. 14. Illustraterd therein is an axial construction of a cylinder 100 of insulating material in which disks 88, 90 and 92 are stacked by alternating interior insulating and metal contact rings 102, 104. Electrical connections to the contact rings 104 are made through slots 106 in the cylinder wall. The heating circuitry and resistive layer are omitted for clarity. The resistive layer of insulated disk 90 is connected to a diametrically split contact ring 104 with the two portions of the ring insulated from each other. A heating lead 64 connects to each portion and are connected through the resistive layer. A second ring 104 above disk 90 is in electrical contact with the bimetallic layers for passing load current through movable contact 96.

Figure 15:
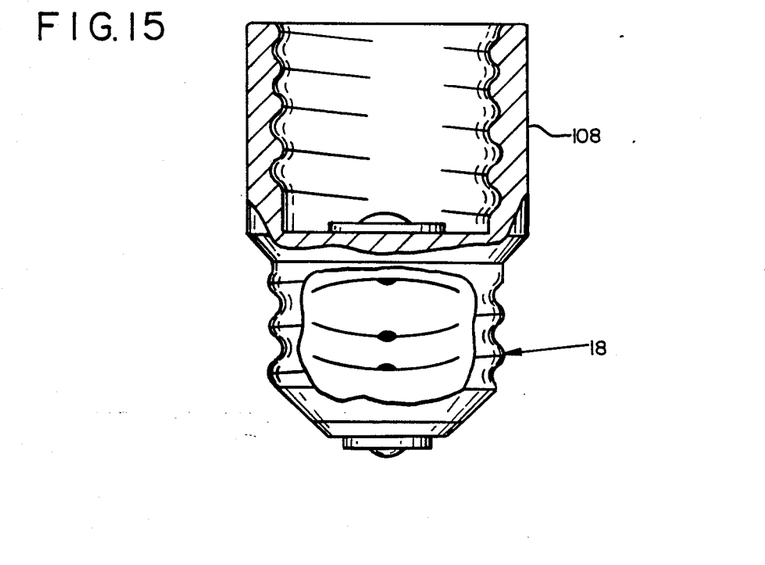
FIG. 15 is a pictorial view, partly in section, of an apparatus utilizing the construction of FIG. 14.

FIG. 15 shows one application of the device construction in FIG. 4. Connected to a standard 120 volt light bulb socket 108 is a three-disk switching device 18 designed to thread within a fixed bulb socket (not shown) on a multiple socket lamp. The output terminals of the device 18 are wired in series with the light socket 108. When the lamp switch is first closed, only bulbs in sockets without the switching device 18 are illuminated. When the lamp switch is turned off and then on again, the bulb in socket 108 also lights.

Having illustrated and described the principles of the invention in preferred embodiments, it should be apparent to those skilled in the art that the invention can be modified in arrangement and detail without departing from such principles. I claim all modifications coming within the spirit and scope of the following claims.

I claim:

1. A switching device for controlling the delivery of power from a power source to a load, comprising:
    input means for receiving the power applied from the power source;
    output means for delivering the applied power to the load; and
    switching means responsive to a momentary interruption of power for changing state from an initial state to a new state that persists until another interruption of power of duration greater than the momentary interruption and sufficient to cause a reset to the initial state, the switching means constructed to connect the input means to the output means in one of the states and to disconnect the input means from the output means in the other of the states.

2. A switching device for controlling the delivery of power from a power source to a load, comprising:
    first detecting means for detecting a power transition and moving in response from a first state to a second state after a first predetermined time;
    second detecting means for detecting the power transition and moving in response from a first state to a second state after a second predetermined time greater than the first time; and
    latch means responsive to the first detecting means being in its first state concurrently with the second detecting means being in its second state for controlling power from the power source to the load,
    said states being concurrent upon a first application of power to move each of the first and second detecting means to its second state followed by an interruption of power to move the first detecting means to its first state while the second detecting means remains momentarily in its second state, the latch means responsive upon a subsequent application of power while said first and second states are still concurrent.

3. The device of claim 2 in which said first and second detecting means form a conductive path to the latch means when said concurrent states exist, said latch means adapted to latch conductively upon the subsequent application of power along the conductive path and to remain conductive until power is again interrupted.

4. The device of claim 3 in which the first and second detecting means comprises first and second electrothermal relays each having a predetermined time for movement between an unstressed state and a stressed state, the electrothermal relays connected in series to form a conductive path when the first relay is moving to its unstressed state and the second relay is still in its stressed state.

5. The device of claim 2 in which the first and second detecting means comprise first and second electromagnetic relays, the first relay normally closed in its first state and the second relay normally open in its first state, the relays connected in series to form a conductive path upon the application of power to open the first relay and close the second relay and the interruption of power to close the first relay while the second relay remains momentarily in its closed state.

6. The device of claim 2 in which first and second detecting means comprise first and second transistors, the first transistor conductive momentarily upon the application of power and the second transistor conductive after the first transistor has become nonconductive, the transistors connected in series to form a conductive path upon the application of power to render the second transistor conductive followed by the interruption of power and the following application of power to render the first transistor conductive before the second transistor is rendered nonconductive.

7. A switching device for controlling the delivery of power from a power source to a remote load, comprising:
    a first electrothermal relay for detecting a power transition and moving in response between an unstressed state and a stressed state after a first predetermined time;
    a second electrothermal relay for detecting a power transition and moving in response between an unstressed state and a stressed state after a second predetermined time greater than the first; and
    a third electrothermal relay responsive to the first relay being in its unstressed state concurrently with the second relay being in its stressed state for controlling power to the load,
    the stressed states of the first and second relays being concurrent upon a first application of power to move each of the first and second relays to its stressed state followed by an interruption of power to move the first relay to its unstressed state while the second relay remains momentarily in its stressed state, the third relay responsive upon a subsequent application of power while said unstressed and stressed states of the first and second relays are still concurrent.

8. The switching device of claim 7 in which each electrothermal relay comprises:
    adjacent metal layers, one metal layer having a greater coefficient of expansion than the other metal layer;
    a movable contact mounted to one of the metal layers;
    a resistive layer deposited adjacent to one of the metal layers for heating, upon application of current, the metal layers to cause the metal layers to expand.

9. The switching device of claim 8 including an insulating layer between the resistive layer and metal layers to isolate current applied to the resistive layer from current applied to the metal layers.

10. The switching device of claim 8 including a conductive layer mounted atop the resistive layer to cause current to flow transversely throughout the resistive layer.

11. The switching device of claim 7 in which each electrothermal relay comprises:
   adjacent disk-shaped metal layers having a predetermined concavity, one of the metal layers having a greater coefficient expansion than the other; and
   a resistive layer deposited adjacent to one of the metal layers for heating, upon application of current, the metal layers to cause then to expand,
   the metal layers adapted to snap from an unstressed state to a stressed state when heated to a predetermined temperature and snap from the stressed state to the unstressed state when cooled below the predetermined temperature.

12. The switching device of claim 7 in which an electrothermal relay comprises:
   a bimetallic disk having a predetermined concavity, said disk adapted to snap between an unstressed state and a stressed state in response to temperature;
   a movable contact mounted on the bimetallic disk;
   a second contact in electrical contact with the movable contact when said disk is in the stressed state;
   means for mounting the bimetallic disk for movement between the unstressed and stressed states; and
   means for heating the bimetallic disk to cause it to change states.

13. The relay of claim 12 in which the heating means comprises a resistive layer deposited adjacent to the bimetallic strip for receiving an electrical current therethrough to heat the bimetallic strip.

14. The relay of claim 13 including a conductive layer mounted in contact with the resistive layer to pass current transversely therethrough.

15. The relay of claim 13 including an insulating layer between the bimetallic strips and the resistive layer to isolate current in the resistive layer from current in the bimetallic strip.

16. The switching device of claim 2 in which the second detecting means comprises a storage element for storing energy from the power source at a controlled rate and moving, upon the storing of a first predetermined amount of energy, from the first state to the second state, the storage element being constructed to dissipate the stored energy at a controlled rate in the absence of applied power and to return from the second state to the first state when the amount of stored energy falls below a second predetermined amount, the dissipation of energy taking place at such a rate that the return from the second state to the first state occurs only after power has been no longer applied for a third time greater than the second time.

17. A switching device for controlling delivery of power from a power source to a remote load, comprising:
   input means for receiving the power applied from the power source;
   a first electrothermal means for moving, in response to the application of power, from an unstressed state to a stressed state after a predetermined time, said stressed state persisting so long as power remains applied, and moving, in response to removal of power, from said stressed state to said unstressed state after a second predetermined time;
   a second electrothermal means moving, in response to the application of power, from an unstressed state to a stressed state after a third predetermined time greater than the first, said stressed state persisting so long as power remains applied, and moving, in response to the removal of power, from said stressed state to said unstressed state after a fourth predetermined time greater than the second;
   a first electrical contact moving between first and second positions in response to the changes between the unstressed and stressed states of the first electrothermal means, the first position corresponding to the first means being in its unstressed state and the second position corresponding to the first means being in its stressed state;
   a second electrical contact moving between third and fourth positions in response to the changes between the unstressed and stressed states of the second electrothermal means, the third position corresponding to the second means being in its unstressed state and the fourth position corresponding to the second means being in its stressed state,
   the second and third positions being of such proximity that the condition of the first electrical contact being in the second position concurrently with the second electrical contact being the third position causes an electrical conductive path to exist between said first and second contacts;
   a third electrical contact moving between fifth and sixth positions, the fifth position being of such proximity to the fourth position that the condition of the second electrical contact being the fourth position concurrently with the third electrical contact being the fifth position causes an electrically conductive path to exist between the second and third contacts;
   a third electrothermal means moving, in response to the application of power concurrent with the conductive path existing between the first and second electrical contacts or between the second and third electrical contacts, from an unstressed state to a stressed state after a fifth predetermined time less than or equal to the first time, said stressed state persisting so long as power remains applied and either of the aforementioned conductive paths exist, and moving, in response to the removal of power, from said stressed state to said unstressed state,
   the third electrothermal means, by being in its unstressed state, causing the third contact to be in the fifth position, and said third actuating means by being in its stressed state, causing the third contact to be in the sixth position; and
   output means for delivering the applied power to the load so long as there exists a conductive path between the second and third contacts.

* * * * *

UNITED STATES PATENT AND TRADEMARK OFFICE
CERTIFICATE OF CORRECTION

PATENT NO. : 4,837,455

DATED : June 6, 1989

INVENTOR(S) : Michael G. Sleator

It is certified that error appears in the above-identified patent and that said Letters Patent is hereby corrected as shown below:

In the Specification:
Column 2, line 3, the word --means-- should be inserted between the words "latch" and "within".
Column 10, line 17, the word "comprise" should be --comprises--.

In the Claims:
Column 14, line 56, the word --and-- should be inserted after the word "layers;".
Column 15, line 59, the word --first-- should be inserted after the word "a".

Signed and Sealed this

Sixth Day of November, 1990

Attest:

HARRY F. MANBECK, JR.

*Attesting Officer*      *Commissioner of Patents and Trademarks*